US005233155A

United States Patent [19]

Frind

[11] Patent Number: 5,233,155

[45] Date of Patent: Aug. 3, 1993

[54] ELIMINATION OF STRIKE-OVER IN RF PLASMA GUNS

[75] Inventor: Gerhard Frind, Altamont, N.Y.

[73] Assignee: General Electric Company, Schenectady, N.Y.

[21] Appl. No.: 654,696

[22] Filed: Feb. 13, 1991

Related U.S. Application Data

[63] Continuation-in-part of Ser. No. 267,865, Nov. 4, 1988, abandoned.

[51] Int. Cl.[5] .......................... B23K 9/00; B23K 10/02

[52] U.S. Cl. ............................ 219/121.52; 219/76.16; 219/121.36; 219/121.45

[58] Field of Search .......... 427/34; 219/76.16, 121.36, 219/121.45, 121.48, 121.5, 121.51, 121.54, 10.79

[56] References Cited

U.S. PATENT DOCUMENTS 3,818,174 6/1974 Camacho .......................... 219/121.5

4,527,550 7/1985 Ruggera et al. ............. 219/10.79 X

OTHER PUBLICATIONS

C. Kittel, *Intro. to Solid State Physics;* (John Wiley & Sons, 1976; pp. 293-301).

*Primary Examiner*—Bernarr E. Gregory

*Attorney, Agent, or Firm*—James Magee, Jr.

[57] ABSTRACT

Strike-over in an RF plasma gun is eliminated by interposing a grounded isolation device between the plasma jet and the RF coil which supplies energy to the plasma. The isolation device comprises a plurality of separated segments spaced apart in a circumferential direction and electrically connected together at one end and to ground potential. The shield substantially eliminates the parasitic distributed capacitance between the RF coil and the plasma by interrupting the electrical field coupling between the coil and the plasma and shunting most of the capacitive current flow to ground. The invention enables reliable operation of the device at frequencies in the 2-4 MHz range.

2 Claims, 4 Drawing Sheets

FIG. 1
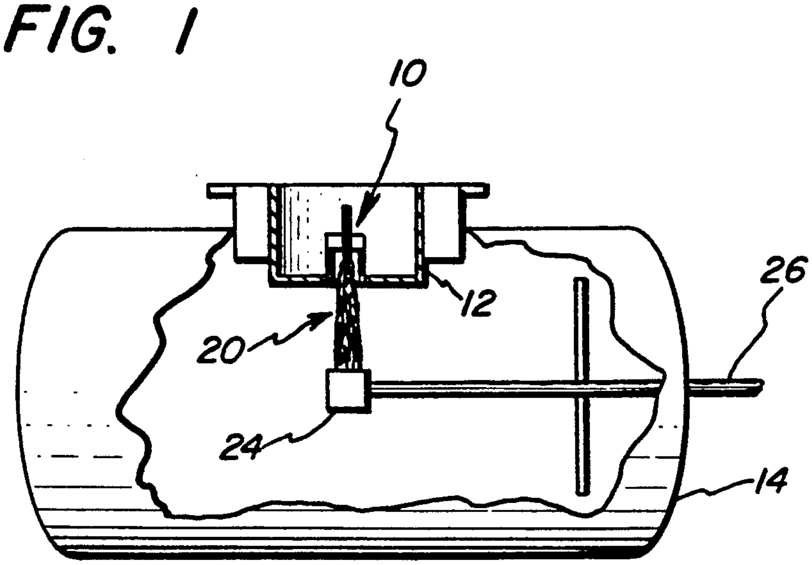
PRIOR ART
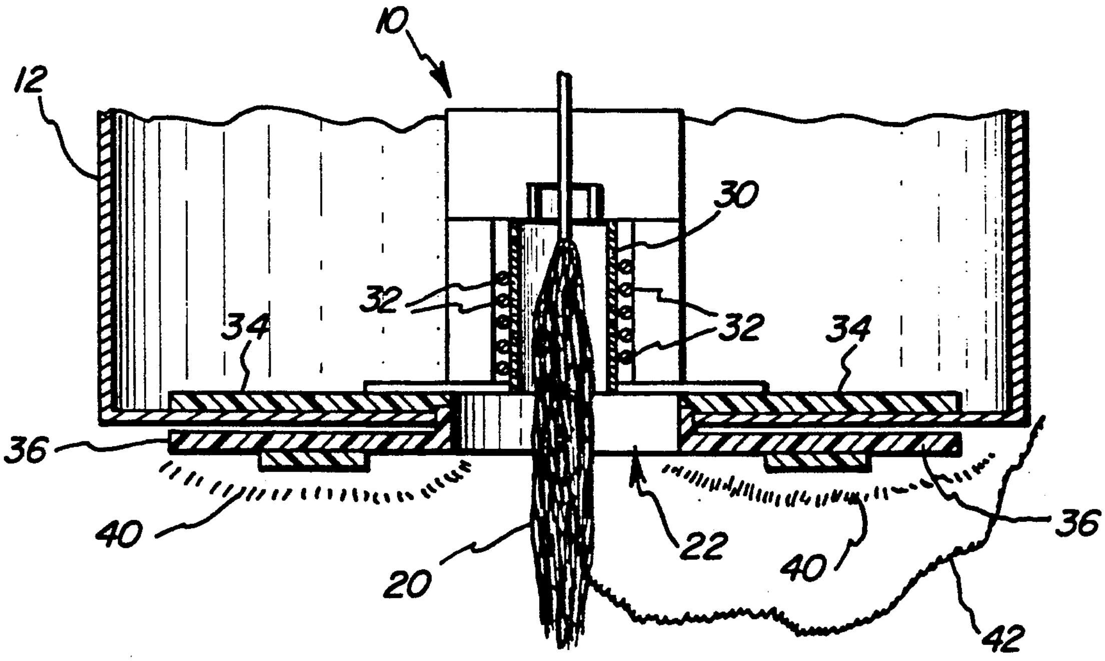
FIG. 2

ELIMINATION OF STRIKE-OVER IN RF PLASMA GUNS

BACKGROUND OF THE INVENTION

This specification is a Continuation-In-Part of Ser. No. 07/267,865, filed Nov. 7, 1988, now abandoned.

This invention relates generally to radio frequency (RF) plasma generating devices, and more particularly to the substantial prevention of strike-over in RF plasma guns.

High frequency induction plasma guns are well known for producing high temperature gaseous plasmas. They find utility in diverse heating applications such as high temperature chemical reactions, heating of solid targets, melting of particles such as of a superalloy, and for providing surface coatings in spray processes.

An RF plasma gun generally comprises an enclosure, for an ionizable gas, and an electrical induction coil surrounding the enclosure and connected to a source of RF electrical current. Quartz is an illustrative enclosure material and argon is a commonly used ionizable gas. The frequency of the RF current typically may be in the range of either 250–450 KHz or 2–4 MHz.

RF plasma guns have excellent heating properties. However, in contrast to DC plasma guns they exhibit a dramatic disadvantage. The plasma jet and hot gases created by the gun often strike-over, i.e., arc-over to ground, as to grounded spray targets or to a grounded tank. Strike-over may cause the plasma jet to be extinguished and may lead to other severe operational problems. In a spray coating process, following a breakdown the spray process has to be terminated and the RF discharge restarted. This is unacceptable for almost any application.

One of the ways in which strike-over has been controlled in the past has been to operate with an ungrounded, tank or spray target. While this may be acceptable in a laboratory environment, it creates a substantial safety hazard and safety risk due to the high RF voltage which may be present on the ungrounded tank or target. In a production environment such safety risks would be unacceptable.

It is therefore desirable to provide an RF plasma device and method in which strike-over is substantially reduced or eliminated and which avoids the foregoing and other problems associated with known RF plasma devices. Moreover, it is desirable to provide an RF plasma device which is capable of operating at higher power levels which afford better heating and melting of particles. It is to these ends that the present invention is directed.

SUMMARY OF THE INVENTION

This invention provides an RF plasma device and method for generating an RF plasma in which strike-over is greatly reduced or substantially eliminated and which affords better heating and melting. The invention is based upon recognition that the reason for the propensity of the plasma jet to strike-over to ground is due to a high voltage stress between the plasma jet and the grounded tank or other grounded surface such as the target. The voltage stress is created by a capacitive current flow which is driven by the RF electrical field from the RF coil to the plasma, and from the plasma to the grounded surface. The coupling is via two parasitic capacitances, one between the RF coil and the plasma and another between the plasma and the grounded surface. Thus, by interrupting the electrical field coupling between the RF coil and the plasma the invention intercepts most or all of the capacitive current flowing from the coil to the plasma, substantially eliminating strike-over.

The invention interrupts the electrical field coupling and intercepts the capacitive current flow by shielding the RF plasma from the electrical field of the RF coil while permitting the magnetic field to energize the plasma. This is accomplished by interposing an electrical isolation member between the coil and the plasma. The isolation member completes an electrical circuit to ground which shunts the capacitive current to ground before it can enter the plasma.

Broadly stated, the invention provides, in one aspect, an RF plasma device which comprises an enclosure defining a cylindrical chamber for a plasma, an electrical induction coil surrounding the enclosure for supplying RF energy to the plasma, and isolation means for interrupting the electrical field coupling between the coil and the plasma in order to reduce the capacitive coupling and capacitive current flow from the coil to the plasma.

In another aspect, the invention provides a method of eliminating strike-over in an RF plasma device which includes means for interrupting the capacitive coupling between the coil and the plasma.

BRIEF DESCRIPTION OF THE DRAWINGS

FIG. 1 is a diagrammatic view which illustrates a typical heating arrangement utilizing an RF plasma generating device;

FIG. 2 is an enlarged view of the RF plasma generating device of the arrangement of FIG. 1;

30

DESCRIPTION OF THE PREFERRED EMBODIMENTS

Figure 3:
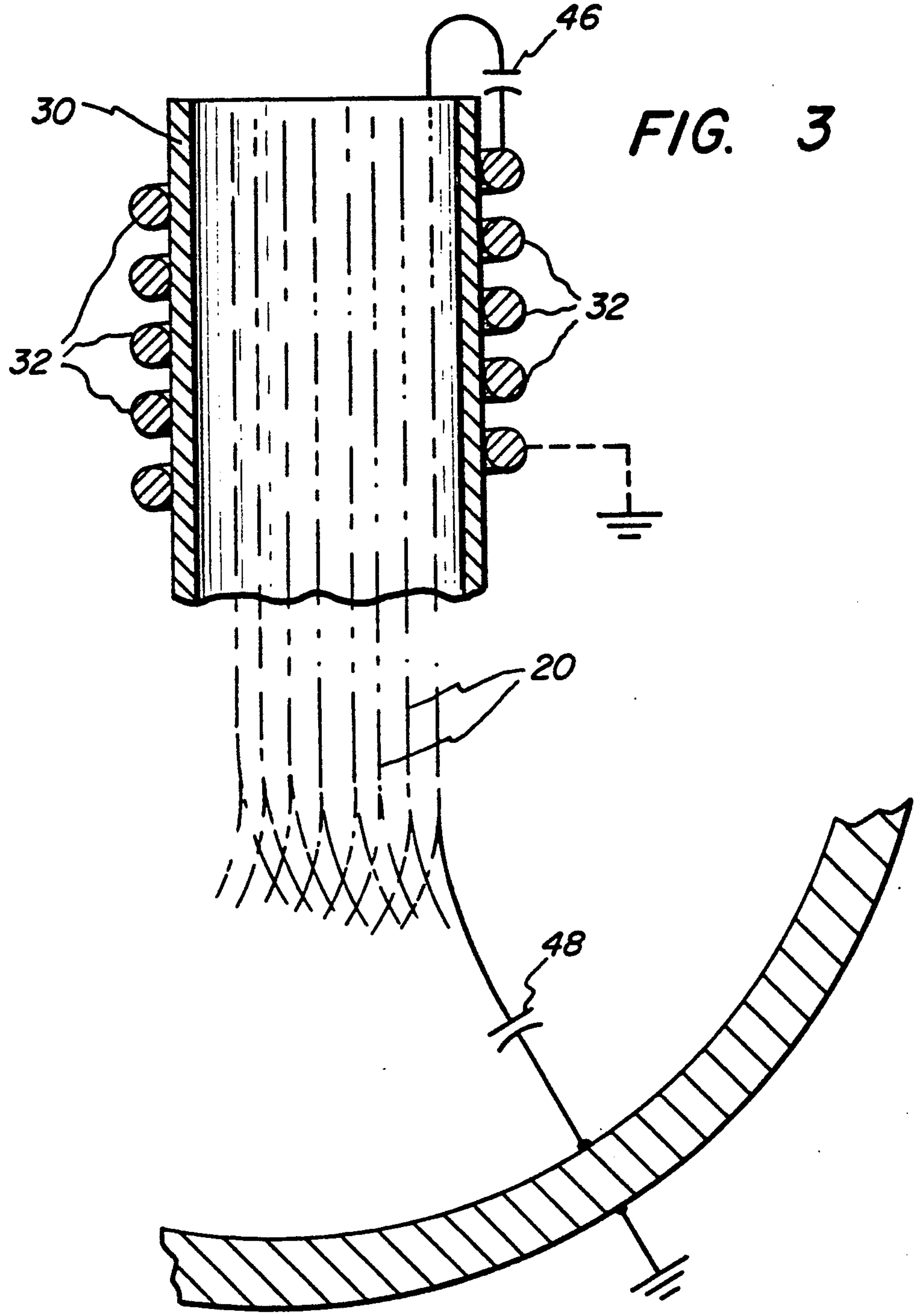
FIG. 3 is a schematic view which illustrates the stray capacitance coupling in the RF plasma generating device.

FIGS. 1 and 2 illustrate diagrammatically a typical arrangement of RF plasma heating apparatus, such as RF spray apparatus for providing a surface coating on a target. As shown, the apparatus may comprise an RF plasma generating device or RF plasma gun 10 disposed within a gun holder 12 comprising, for example, a cylindrical metal well which projects into the interior of a metal tank 14. The RF plasma gun may be positioned in the bottom of the metal well and arranged so as to inject a plasma 20 into the tank through an opening 22 in the well (see FIG. 2) for heating or otherwise treating a target 24 within the tank which is carried by a mechanical actuator or sting 26. The mechanical actuator enables the target to be positioned and rotated relative to the plasma. In RF spray coating apparatus, particles of the coating material, such as a superalloy, may be injected into the plasma, melted, and sprayed onto the target to provide a surface coating.

As will be described in more detail shortly, RF plasma gun 10 may comprise, in a conventional manner, a tubular enclosure 30, as of quartz, which forms a cylindrical chamber for the plasma. An electrical induction coil 32 adapted for connection to a source of RF Energy (not illustrated) may surround enclosure 30 for coupling RF energy to an ionizable gas, as of argon, which is injected into the chamber in order to produce the plasma. As indicated in FIG. 2, the plasma exits the chamber through an open end of the tubular enclosure, and the RF gun is positioned within the well so that the plasma is injected into the tank through opening 22.

As shown in FIG. 2, RF plasma gun 10 may be electrically insulated from the metal wall of the well and the tank by insulators 34 and 36. Nevertheless, during operation of the RF plasma gun, a corona discharge 40 which extends from the plasma around insulators 36 to the insulated metal wall of the well 12 is typically present. The corona discharge represents an RF current path from the plasma to the metal wall of the gun holder well. When strike-over occurs, there is an electrical breakdown and a breakdown current path, such as shown at 42, is created which extends from the plasma to the metal wall of the gun holder. Breakdown may also occur to the wall of the grounded tank 14 or to other grounded structures in the tank such as the mechanical actuator 30. At strike-over, the breakdown current may be of the order of 10–50 amps or higher. Strike-over may cause the plasma jet to be extinguished and, in RF spray apparatus, necessitates that the spray process be terminated and the RF discharge reinitiated, which is unacceptable for most applications.

It has been found that the reason for the propensity of the plasma jet to strike-over to ground is due to a high voltage stress between the plasma jet and the grounded tank wall or other grounded surface in the tank, such as the target. The voltage stress is created by a capacitive current which is driven by the RF electrical field coupled from the RF coil to the plasma and from the plasma to the grounded tank or surface. As indicated schematically in FIG. 3, the coupling from the RF coil 32 to the plasma 20 is via a first stray or parasitic capacitance 46, and the coupling between the plasma and the tank wall 14 is via a second stray capacitance 48. Capacitances 46 and 48 shown in FIG. 3 respectively represent the distributed capacitance between the RF coil and the plasma and between the plasma and the tank wall. These capacitances together with the plasma form an electrical circuit from the RF Coil to ground through which capacitive current flows. The intensity of the capacitive current flowing from the RF coil to the plasma jet and from the plasma jet to the grounded tank before breakdown of the cold gas between the plasma jet and the tank wall is determined by the average values of the two series capacitances 46 and 48. After electrical breakdown, capacitance 48 is essentially shorted out by the arc and the capacitive current flow is determined by the value of the stray capacitance 46 between the RF coil and the plasma. If the total value of this capacitance is C and the plasma resistance is assumed to be negligible, the capacitive current $I_c$ flowing is:

$$I_c = U_{coil}\, wC \quad (1)$$

where $w = 2\pi f$ is the angular frequency corresponding to the frequency, f, of the RF voltage $U_{coil}$, which is applied to coil 32.

This equation (1) indicates that the capacitive current can be reduced by decreasing either the power frequency of the RF Source or by reducing the capacitance between the coil and the plasma. It has been found that decreasing the power frequency from 2 MHz, for example, to 400 KHz leads to a significant decrease in capacitive current and, accordingly, to a substantial reduction in strike-over. The use of a lower RF frequency, however, is disadvantageous in that it diminishes the magnetic coupling between the plasma and the exciting field of the RF coil. The magnetic component, B, of the electromagnetic field produced by the coil is the primary heating mechanism of the plasma, and it creates a circular electric field $E_\phi$ in the RF discharge which is given by:

$$E\phi = \frac{f\, B}{(\mu\sigma \cdot 10^{-9})^{\frac{1}{2}}}\ \frac{\text{volt}}{\text{cm}} \quad (2)$$

where $\mu$ is the permeability and $\sigma$ is electrical conductivity.

Equation (2) indicates that as the frequency is decreased, the electrical field $E_\phi$ is also reduced. If reduced too much, the electric field may become too small to sustain discharges in gases which require high electrical gradients, particularly discharges containing a high percentage of hydrogen gas. Hydrogen gas is a desirable component of the ionizable gaseous mixture since it affords increased heating capability of the RF plasma and allows better heating or melting of particles which are more difficult to heat. Thus, the reduction in the circular electric field $E_\phi$ which accompanies the decrease in RF frequency is disadvantageous in that it diminishes the heating capability of the RF plasma. The use of a lower power frequency also has the disadvantage of producing a smaller operational plasma envelope for the RF plasma gun. Thus, it is desirable to operate the RF plasma gun at higher frequencies, rather than at lower frequencies, and to reduce the capacitive current flow in another way.

Equation (1) indicates that the capacitive current is also proportional to the stray capacitance between the RF coil and the plasma, corresponding to capacitance 46 of FIG. 3. As previously noted, the current can be reduced by reducing this capacitance rather than the RF power frequency. This is the approach taken by the invention. The invention effects a significant reduction in this capacitance by substantially isolating the RF plasma from the electrical field of the RF coil by interposing a grounding member which is permeable to the magnetic field, herein called an isolation member between the plasma and the coil. The isolation member is electrically connected to ground so that it intercepts the capacitive current flowing from the coil to the plasma and shunts the current to ground before it can enter the RF plasma. Since it is the RF electrical field from the coil to the plasma which drives the capacitive current flow, by shunting the current to ground the plasma is effectively isolated and strike-over is substantially eliminated without extinguishing the plasma.

Figure 4A:
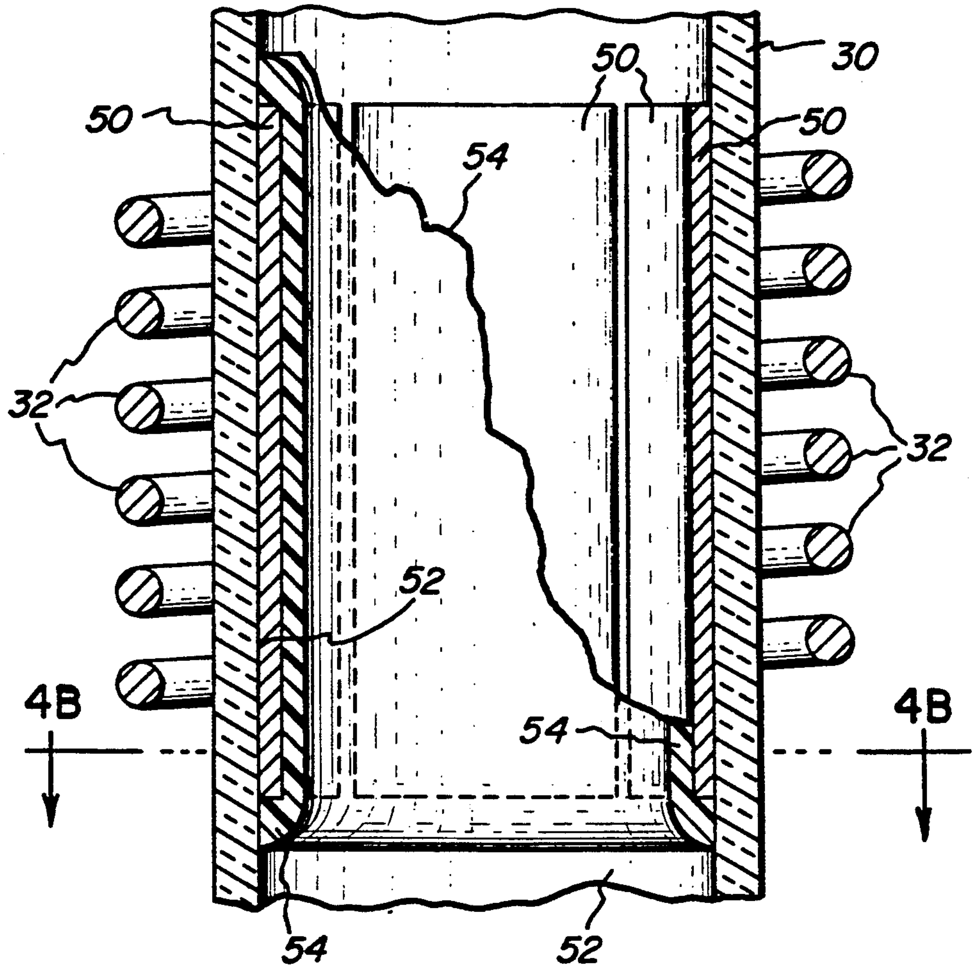
FIGS. 4A and 4B are, respectively, longitudinal and transverse sectional views of a first isolation arrangement in accordance with the invention which may be employed with the plasma generating device of FIG. 3, FIG. 4A being partially broken away and FIG. 4B being taken along the line 4B—4B of FIG. 4A.
Figure 4B:
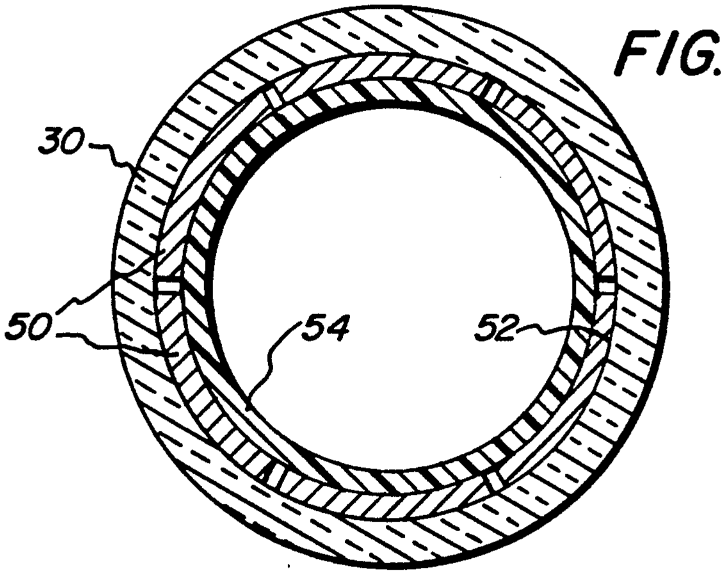

FIGS. 4A and 4B show an isolation arrangement in accordance with the invention which comprises a slotted shield member in the form of a plurality of elongated metal segments 50 separated by slots or gaps between adjacent segments. The segments are disposed on the inner surface 52 of tubular quartz enclosure 30. The segments are electrically connected to ground (not shown) as later described. The isolation device, i.e., the spaced apart segments extend in the axial direction of the tubular member. The gaps between adjacent segments permit entry of the magnetic field into the plasma chamber. Providing the isolation member in the form of slotted segments interrupts the circular current which otherwise would flow in the isolation member.

Although only one slot or gap is required to provide adequate isolation, i.e., a single longitudinal gap, it is preferred that multiple gaps be provided in order to reduce the potential for breakdown across gaps between segments.

The metal segments can be provided by any convenient techniques. A slotted or gapped set of metal segments can be assembled and placed within the quartz tube of the RF apparatus. Alternatively, the metal segments can be deposited onto the tubular enclosure by plating or by plasma spray techniques.

If desired, the segments can be covered with an insulating layer such as silica shown at 54 in order to prevent electrical contact between the plasma and the isolation member.

Figure 5:
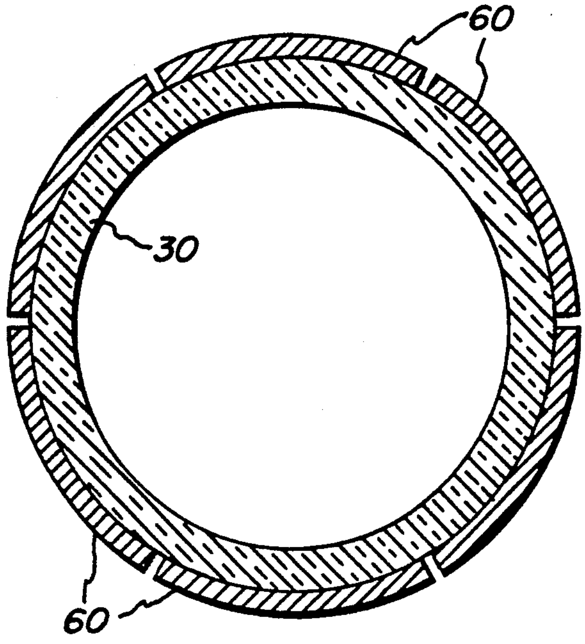
FIG. 5 is a transverse sectional view similar to FIG. 4B which illustrates another form of an isolation member arrangement in accordance with the invention.

FIG. 5 is a transverse sectional view similar to FIG. 4B which illustrates another isolation arrangement which may be employed in practice of the invention. The embodiment of FIG. 5 differs from that just described in that the gapped segments 60 are positioned on the exterior surface of the tubular quartz enclosure 30, rather than on the interior surface as shown in FIGS. 4A–B. In order for the isolation device to interrupt the capacitive currents, it is only necessary that it be interposed between the RF coil 32 and the plasma within the enclosure, and that the device can be grounded. Grounding can be accomplished by joining the segments together at one end and connecting them electrically to ground potential.

Figure 6:
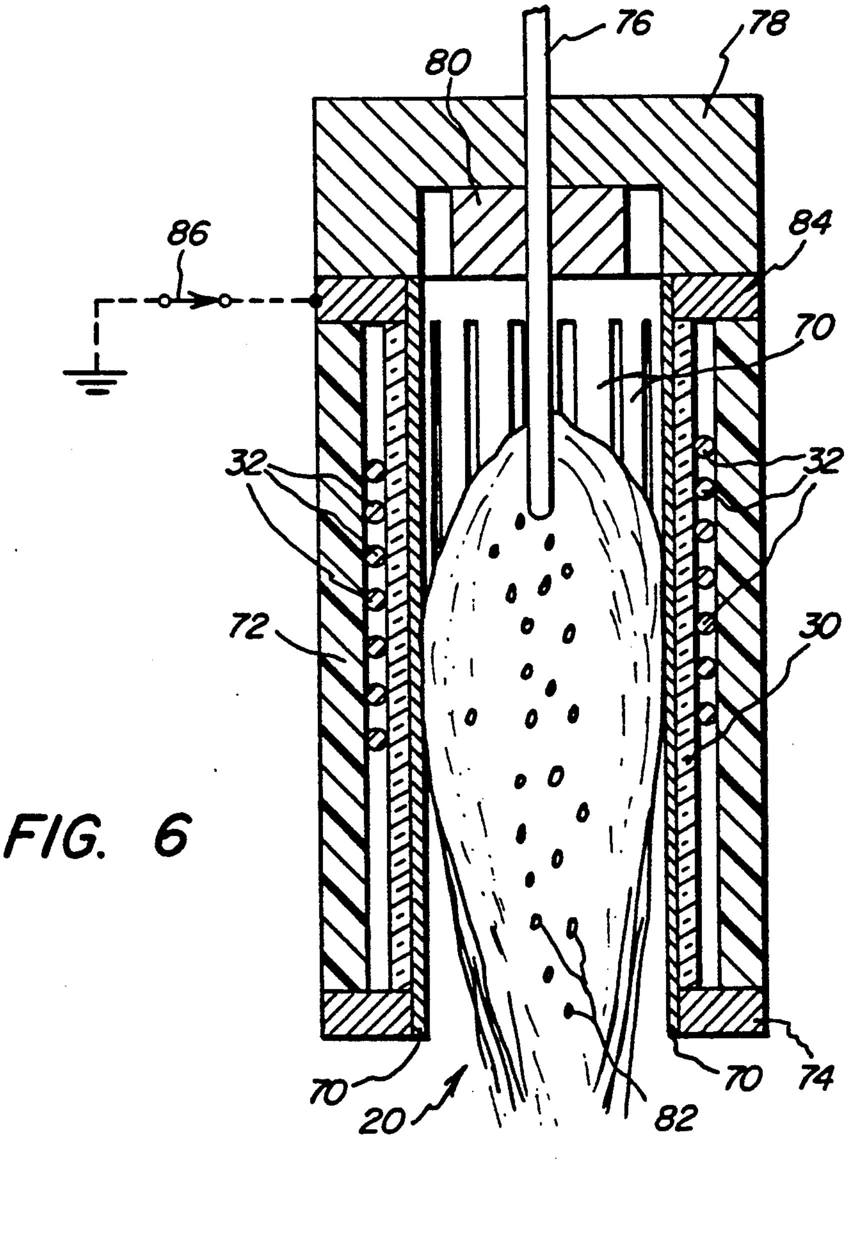
FIG. 6 illustrates diagrammatically in somewhat more detail an RF plasma generating device in accordance with the invention.

FIG. 6 illustrates in somewhat more detail an embodiment of an RF plasma spray gun in accordance with the invention. The gun of FIG. 6 employs an isolation arrangement similar to that illustrated in FIGS. 4A–B in which an isolation device comprising separated segments 70 are disposed on the inner surface of the tubular quartz enclosure 30 which forms the plasma chamber. The RF coil 32 surrounds the tubular enclosure and is coaxial therewith. A second tubular insulating member 72, such as of Teflon material, may be disposed about the coil. An annular ring 74 at the exit end (bottom end in the figure) of the RF spray gun may be provided for holding the structure together and to provide a mounting. A water cooled particle injection tube 76 may extend coaxially into the plasma chamber through an end member 78 and a gas injection ring 80. The particle injection tube enables particles 82 as of a superalloy, for example, to be injected into the plasma stream so that they may be melted and sprayed upon a target by the plasma jet. An ionizable gas mixture enters the plasma chamber via passageways (not shown) in the gas injection ring, which may enable a plurality of gas streams to be injected into the chamber both axially and tangentially. In the gun of FIG. 6, the segments of the metal isolation member 70 may be connected together at the gas injection end of the plasma gun by a metal ring 84 which is in turn electrically connected to ground (preferably through a switch 86) as shown schematically in the figure.

The segments 70 may be in the form of tubes connected together through which water or other coolant flows in order to protect enclosure 30 from the heat produced by the plasma jet. In this event, member 84 may comprise inlet and outlet manifolds for cooling water and the tubes may be connected to the manifolds such that the water may circular through the tubes. The RF plasma gun may be similar to a conventional TAFA, Company plasma gun which employs a plurality of axially extending cooling tubes through which water is circulated for protecting the tubular enclosure. In the TAFA gun, the cooling tubes are not at ground potential.

To test the effectiveness of the invention, a conventional TAFA RF spray gun having a cooling arrangement such as just described was modified to allow the separated metal wall cooling tubes to be electrically connected to ground by a switch such as switch 86. The gun was operated at a power frequency of 2.3 MHz, and the RF discharge was started with the switch open so that the cooling tubes forming the isolation means were not grounded. With the switch open, the input power was increased to approximately 30 KW. A strong plasma corona such as 40 in FIG. 2 and arcing to the grounded tank occurred. Upon closing the switch, all irregular discharges, corona and arc-over phenomena vanished completely, while the main RF discharge stayed active. This test was repeated several times with identical results. Next, the test was repeated using a range of tank pressures between 30–300 torr and input powers between 30–120 KW. Even at a low pressure of 30 torr, where previous experience had indicated corona and arcing occurred easily in the 2–4 MHz range, no corona or arc-over phenomena was observed.

The test results indicate that the invention affords a substantial reduction in the capacitance between the RF coil and the plasma, and that it substantially eliminates strike-over. By enabling operation at higher frequencies, as in the 2–4 MHz range, the invention affords a much greater operational envelope which, in turn, affords greater arc stability and allows the use of gas mixtures which afford better particle heating. This allows better heating or melting of particles which are hard to heat.

While preferred embodiments of the invention have been shown and described, it will be appreciated by those skilled in the art that changes may be made in these embodiments without departing from the principles and spirit of the invention, the scope of which is defined in the appended claims.

What is claimed is:

1. A radio frequency gaseous plasma gun comprising an enclosure defining a cylindrical plasma chamber; an electrical induction coil surrounding the enclosure for supplying radio frequency energy to a plasma; and a slotted metal shield consisting of a plurality of spaced metal segments connected to ground potential disposed between the coil and the plasma.

2. A radio frequency plasma gun comprising an enclosure defining a cylindrical plasma chamber; and an electrical induction coil surrounding the enclosure for supplying radio frequency energy to a plasma; and a grounded radio frequency permeable slotted metal shield disposed between the coil and the chamber.

* * * * *